(12) United States Patent
Skarie

(10) Patent No.: US 11,015,099 B2
(45) Date of Patent: May 25, 2021

(54) TRACTION ENHANCING AGGREGATE

(71) Applicant: James B. Skarie, Minnetonka, MN (US)

(72) Inventor: James B. Skarie, Minnetonka, MN (US)

( * ) Notice: Subject to any disclaimer, the term of this patent is extended or adjusted under 35 U.S.C. 154(b) by 0 days.

(21) Appl. No.: 16/662,689

(22) Filed: Oct. 24, 2019

(65) Prior Publication Data

US 2020/0263066 A1      Aug. 20, 2020

Related U.S. Application Data

(60) Provisional application No. 62/742,662, filed on Oct. 8, 2018.

(51) Int. Cl.
| | | |
|---|---|---|
| *C09K 3/14* | (2006.01) | |
| *B60B 39/04* | (2006.01) | |
| *B32B 3/00* | (2006.01) | |

(52) U.S. Cl.
CPC ............ *C09K 3/149* (2013.01); *B32B 3/00* (2013.01); *B60B 39/04* (2013.01); *Y10T 428/24182* (2015.01)

(58) Field of Classification Search
CPC .............. Y10T 428/21; Y10T 428/213; Y10T 428/24182; Y10T 428/24174; Y10T 428/2982; C09K 3/149
See application file for complete search history.

(56) References Cited

FOREIGN PATENT DOCUMENTS

GB               668144        *    3/1952

\* cited by examiner

*Primary Examiner* — Alexander S Thomas
(74) *Attorney, Agent, or Firm* — Antonio Papageorgiou, Esq.; Lombard Geliebter LLP

(57) ABSTRACT

A traction enhancing aggregate is provided comprised of a body with a side having a top and bottom with each having three or more protruding conical masses with axes positioned about a circular centerline and made from moldable material capable of being delivered by hand or traction enhancing system to a lower surface such as ground to provide an increased coefficient of friction between an upper surface such as a shoe or tire and a lower surface.

21 Claims, 17 Drawing Sheets

TRACTION ENHANCING AGGREGATE

RELATED APPLICATIONS

This application claims the benefit of U.S. (Provisional) Application No. 62/742,662 filed on Oct. 8, 2018.

The subject matter of the present application is related to U.S. Pat. No. 10,239,350 dated Mar. 26, 2019, application Ser. No. 15/030,093 filed on Oct. 17, 2014, which is incorporated herein by reference.

BACKGROUND OF THE INVENTION

The present application relates to aggregates in particular to aggregates that are used on surfaces beneath vehicles, humans and animals to increase the coefficient of friction between object or subject and a surface.

In climates subject to winter conditions, in locations where the ambient temperatures fall below 32 degrees Fahrenheit, freezing moisture causes ice to form on paved surfaces such as roads and walkways. Ice proves to be a serious hazard. When encountering ice, vehicles can be inhibited from stopping or staying on course. Likewise humans and animals can encounter difficulty staying a foot.

In these climates, common practice is the use of sand or gravel to increase the coefficient of friction or salts to melt the ice from a surface. While providing a measure of improvement to the coefficient of friction, between object or subject and a surface, these methods are not optimal in solving the problem of hazardous ice.

Attempts to use sand, gravel or other natural crushed rock aggregates largely fall short, of being efficient, primarily because gravel and other crushed rock aggregates are irregular in form. Natural mediums deposited on ice, for the most part, have a tendency to contact the ice landing in contact with the ice on their planar sides in lieu of biting into the surface of the ice at their vertex points.

Attempts to use salt, for the most part, serve primarily to melt ice and expose the road or walkway natural surface. Salt preforms this function over a period of time. It is not immediate and becomes totally ineffective once it fully dissolves.

Rain can be dangerous as well. Thousands of vehicles are challenged by wet driving conditions and the accidents they cause. When it rains, water and other substances on road surfaces such as oils create a barrier between the road and tires. The liquid film that forms can cause loss of traction or hydroplaning across a road surface.

Accordingly there is a need for a traction enhancing aggregate that dissolves slowly, has a regular symmetric form with planar surfaces not able to contact the surface it comes to rest on and pointed vertices able to penetrate ice or wet conditions overcoming the problem of vehicles stopping or staying on course and humans and animals staying a foot when on ice or wet conditions.

SUMMARY OF THE INVENTION

A traction enhancing aggregate according to at least one embodiment is provided that includes a body having a top surface and a bottom surface opposite the top surface, and at least three masses protruding outward from each of the top and bottom surfaces and having a vertex for biting into a surface to be traction enhanced with the aggregate.

In at least one embodiment, the body further having a side surface located between the top and bottom surfaces.

In at least one embodiment, the at least three masses on the top and bottom surfaces each have an axis and wherein the axis of the at least three masses on the top surface, bottom surface, or both surfaces, are centralized and equidistantly placed on the respective top and bottom surfaces.

In at least one embodiment, the masses are conically shaped.

In at least one embodiment, the masses are right angle conically shaped.

In at least one embodiment, the top and bottom surfaces are essentially parallel to each other.

In at least one embodiment, the body further has a side surface located between the top and bottom surfaces, and wherein the side surface is essentially perpendicular to one or both of the top and bottom surfaces.

In at least one embodiment, the body further has one or more depression in one or both of the top and bottom surfaces.

In at least one embodiment, at least one of the one or more depressions is centrally located on one or both of the top and bottom surfaces.

In at least one embodiment, the body further has one or more apertures extending through the top and bottom surfaces.

In at least one embodiment, at least one of the one or more apertures is centrally located on the top and bottom surfaces.

In at least one embodiment, the at least three masses on the top surface are located thereon in locations that mirror locations of the at least three masses on the bottom surface.

In at least one embodiment, the at least three masses on the top, bottom, or both top and bottom surfaces have axes that are perpendicular to the respective top and bottom surfaces.

In at least one embodiment, the top and bottom surfaces each have a same number of masses thereon.

In at least one embodiment, the masses on the top surface are arranged an orientation that mirrors the orientation of the masses on the bottom surface.

In at least one embodiment, the masses on the top surface are arranged a staggered orientation relative to the masses on the bottom surface.

In at least one embodiment, a height of the aggregate measured between apex of the masses on the top and bottom surfaces is plus or minus 15 percent of 0.25 inches.

In at least one embodiment, a width of the aggregate measures plus or minus 15 percent of 0.5 inches.

A traction enhancing aggregate according to at least one other embodiment is provided that includes a body having a top surface and a bottom surface opposite and essentially parallel to the top surface, and at least three conical masses protruding outward from each of the top and bottom surfaces and having a vertex for biting into a surface to be traction enhanced with the aggregate, wherein the at least three masses on the top and bottom surfaces each have an axis and wherein the axis of the at least three masses on the top surface, bottom surface, or both surfaces, are centralized and equidistantly placed on the respective top and bottom surfaces, and wherein a height of the aggregate measured between apex of the masses on the top and bottom surfaces is plus or minus 15 percent of 0.25 inches, and wherein a width of the aggregate measures plus or minus 15 percent of 0.5 inches.

Additional aspects of the present invention will be apparent in view of the description which follows.

DETAILED DESCRIPTION OF THE INVENTION

Figure 1:
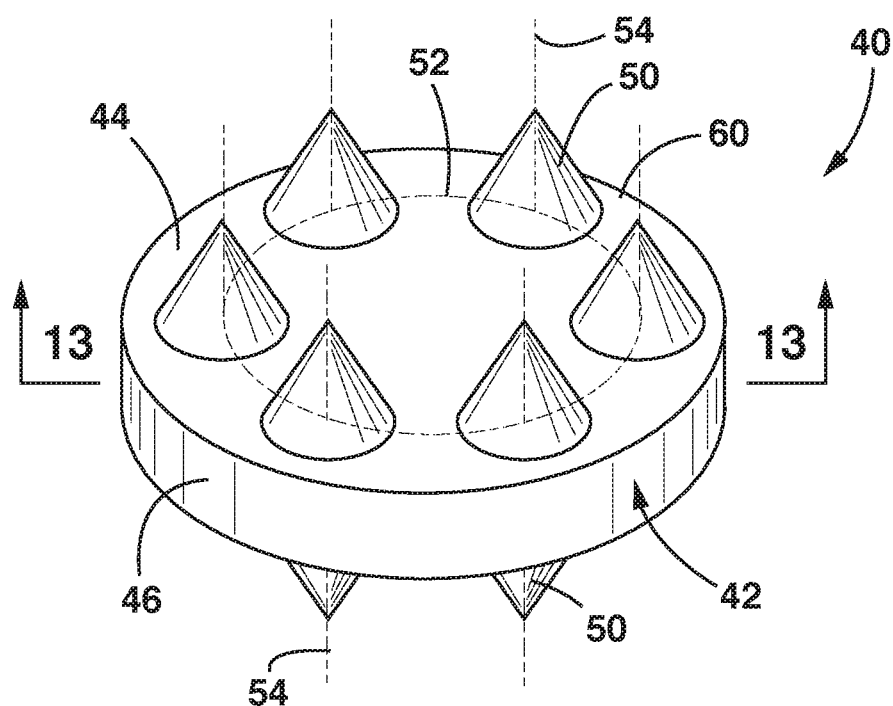
FIG. 1 is a top perspective schematic representation of traction enhancing aggregate.
Figure 2:
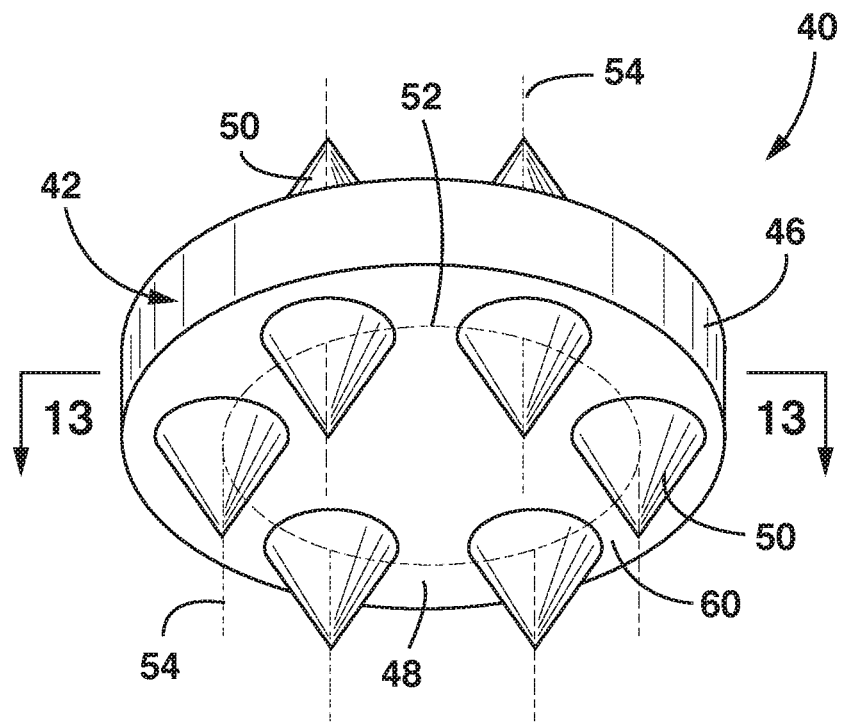
FIG. 2 is a bottom perspective schematic representation of traction enhancing aggregate.
Figure 3:
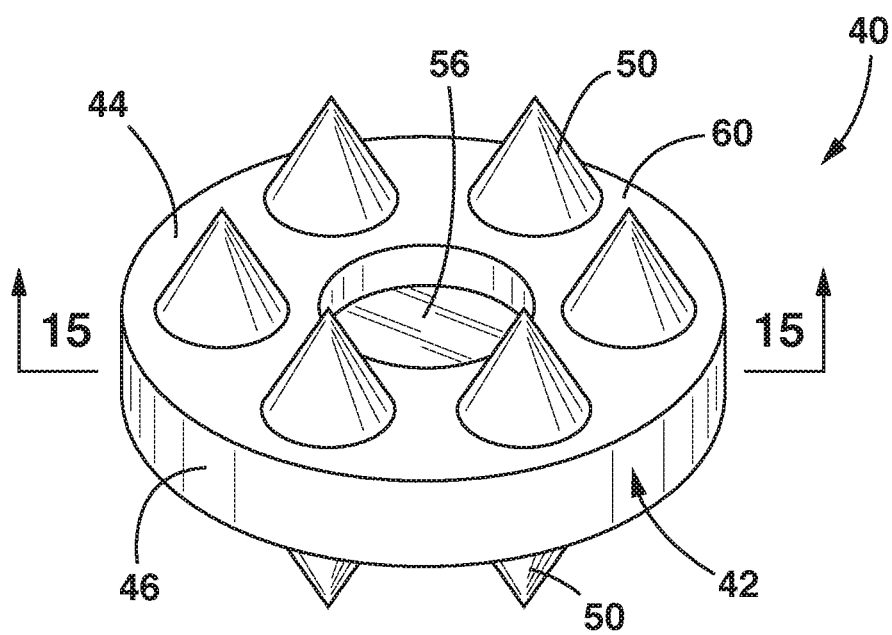
FIG. 3 is a top perspective schematic representation of a second embodiment of traction enhancing aggregate.
Figure 4:
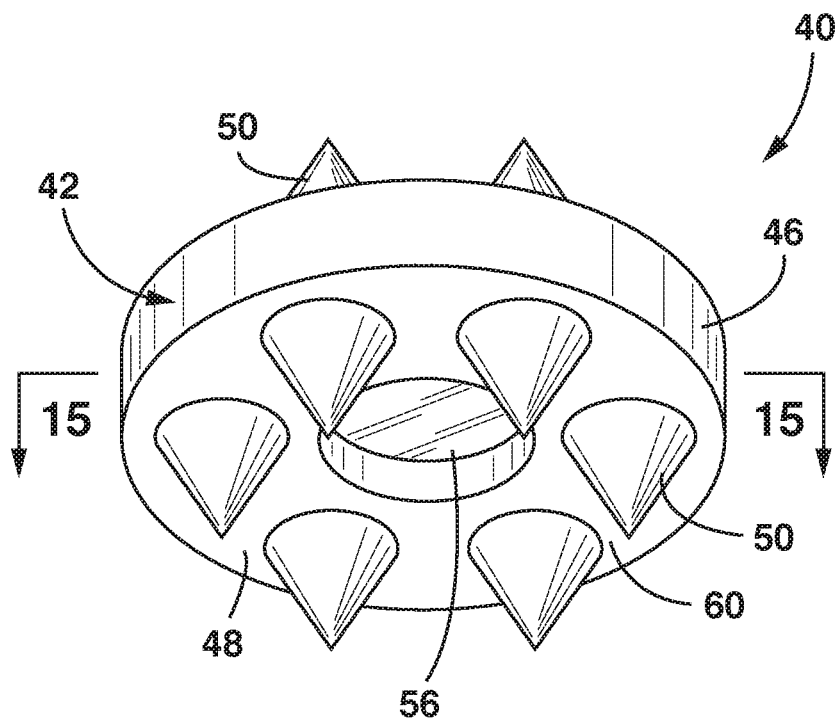
FIG. 4 is a bottom perspective schematic representation of a second embodiment of traction enhancing aggregate.
Figure 5:
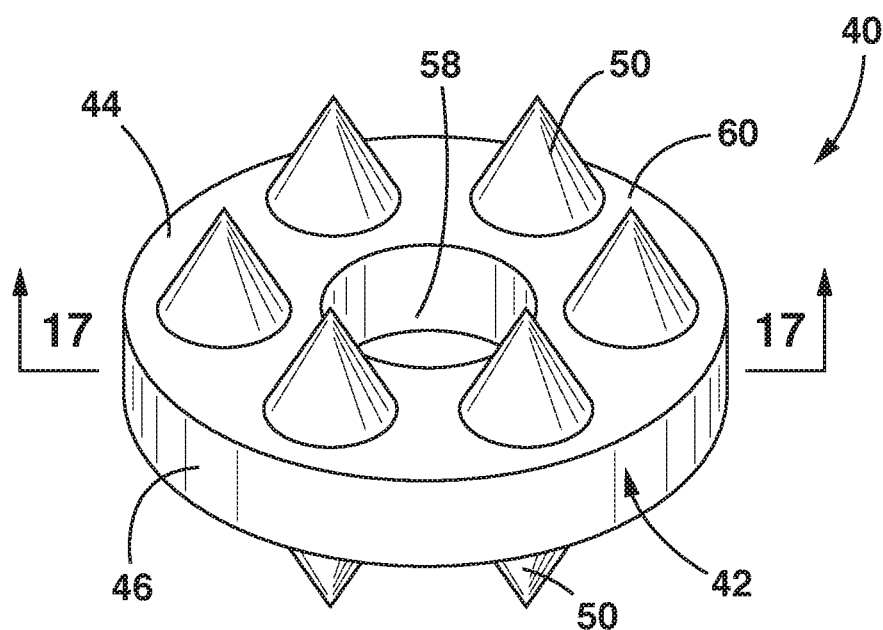
FIG. 5 is a top perspective schematic representation of a third embodiment of traction enhancing aggregate.
Figure 6:
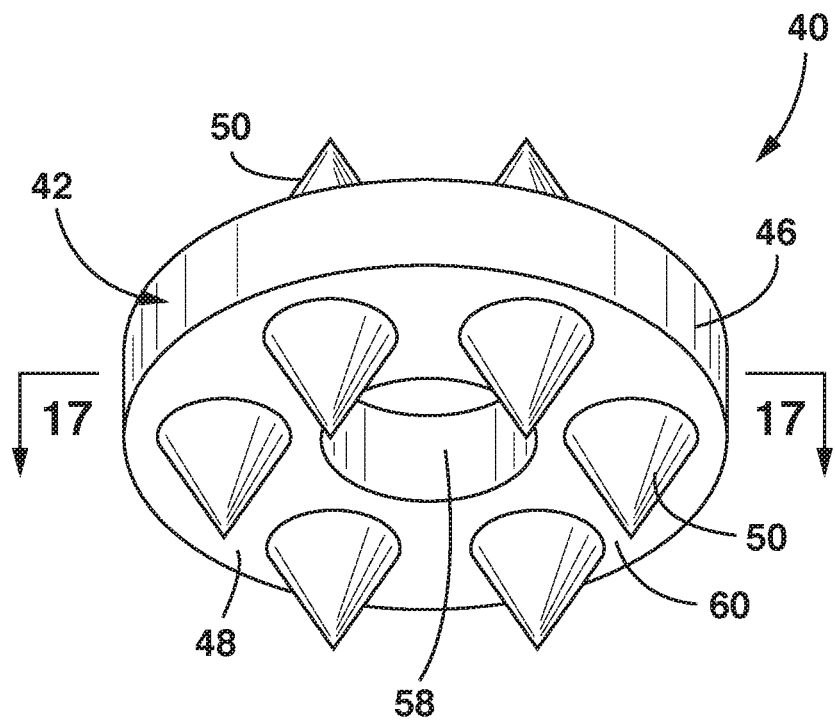
FIG. 6 is a bottom perspective schematic representation of a third embodiment of traction enhancing aggregate.
Figure 7:
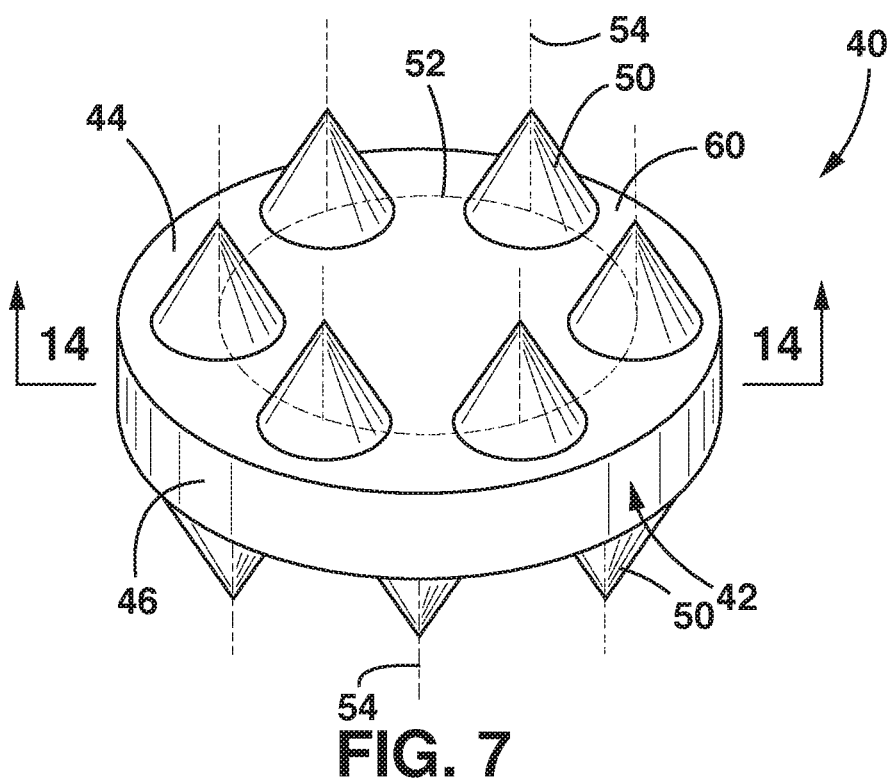
FIG. 7 is a top perspective schematic representation of a fourth embodiment of traction enhancing aggregate.
Figure 8:
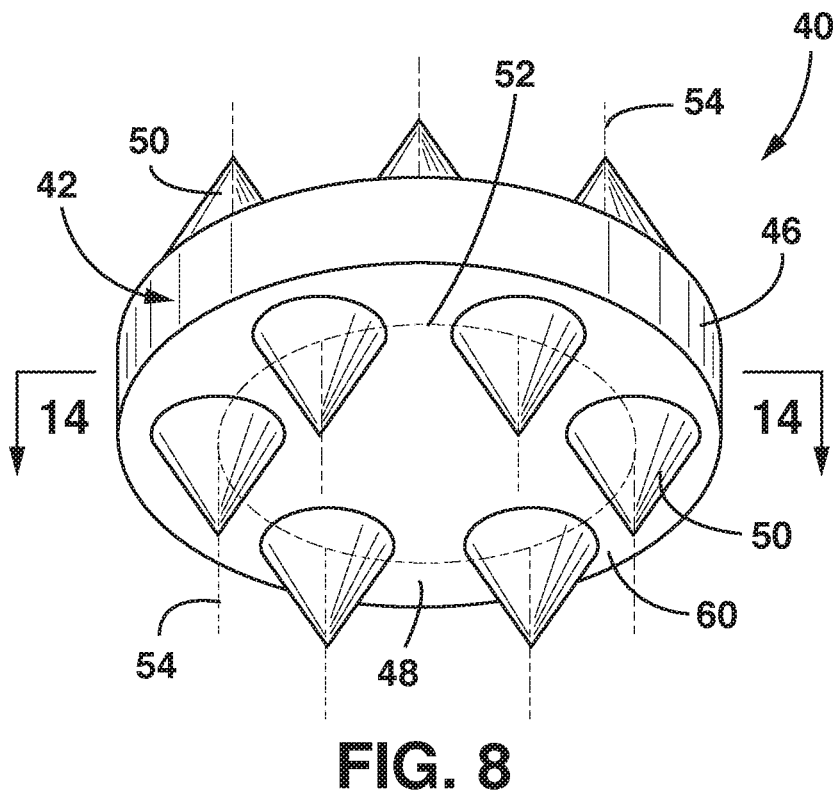
FIG. 8 is a bottom perspective schematic representation of a fourth embodiment of traction enhancing aggregate.
Figure 9:
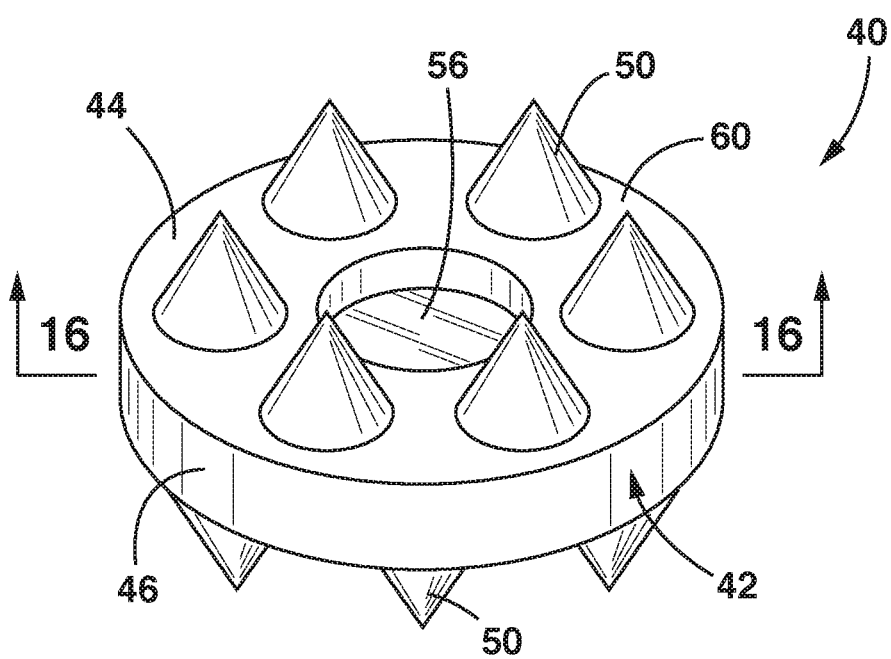
FIG. 9 is a top perspective schematic representation of a fifth embodiment of traction enhancing aggregate.
Figure 10:
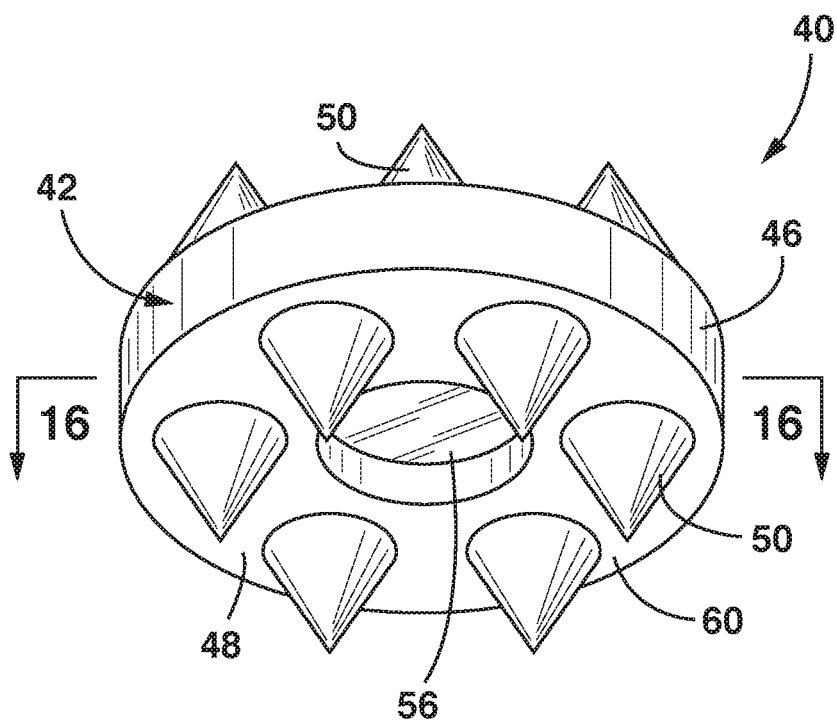
FIG. 10 is a bottom perspective schematic representation of a fifth embodiment of traction enhancing aggregate.
Figure 11:
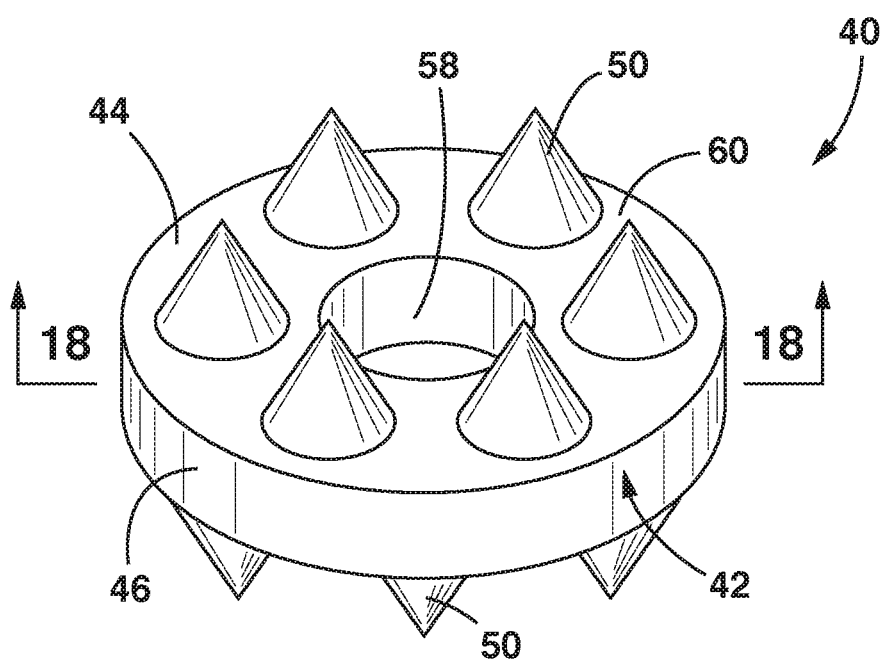
FIG. 11 is a top perspective schematic representation of a sixth embodiment of traction enhancing aggregate.
Figure 12:
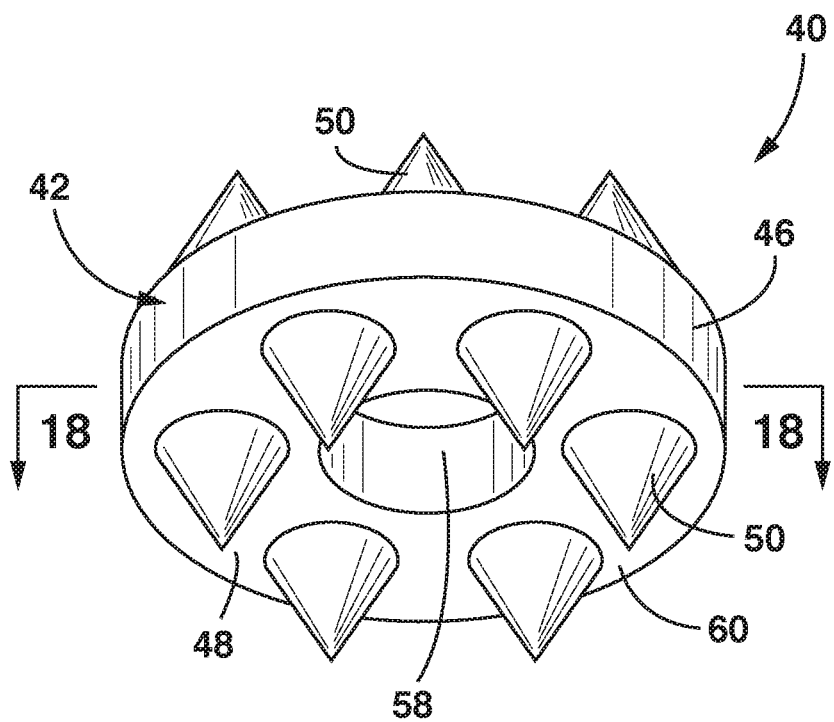
FIG. 12 is a bottom perspective schematic representation of a sixth embodiment of traction enhancing aggregate.
Figure 13:
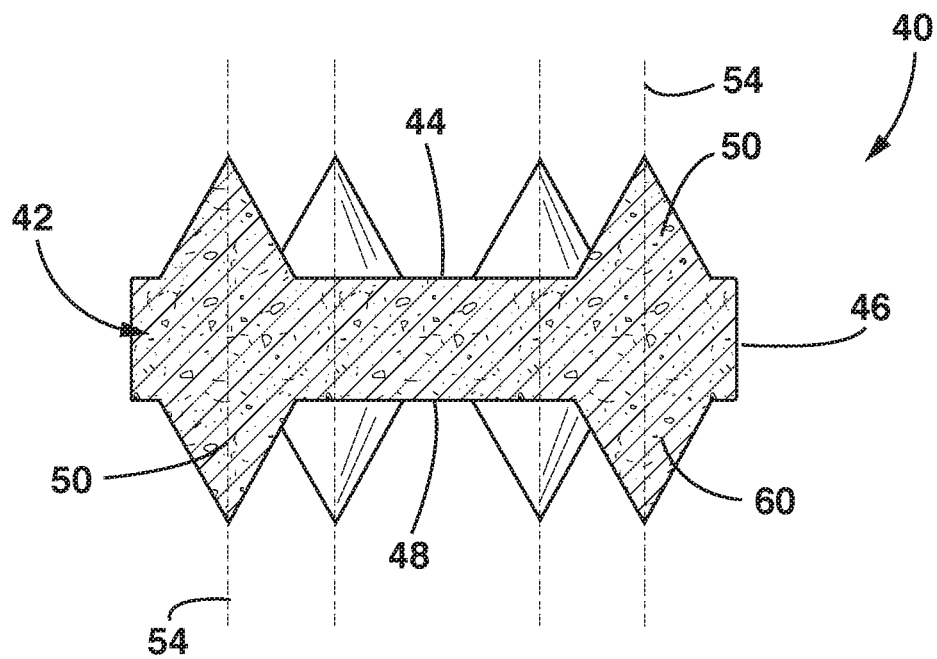
FIG. 13 is a center sectional schematic representation view taken from FIG. 1 and FIG. 2.
Figure 14:
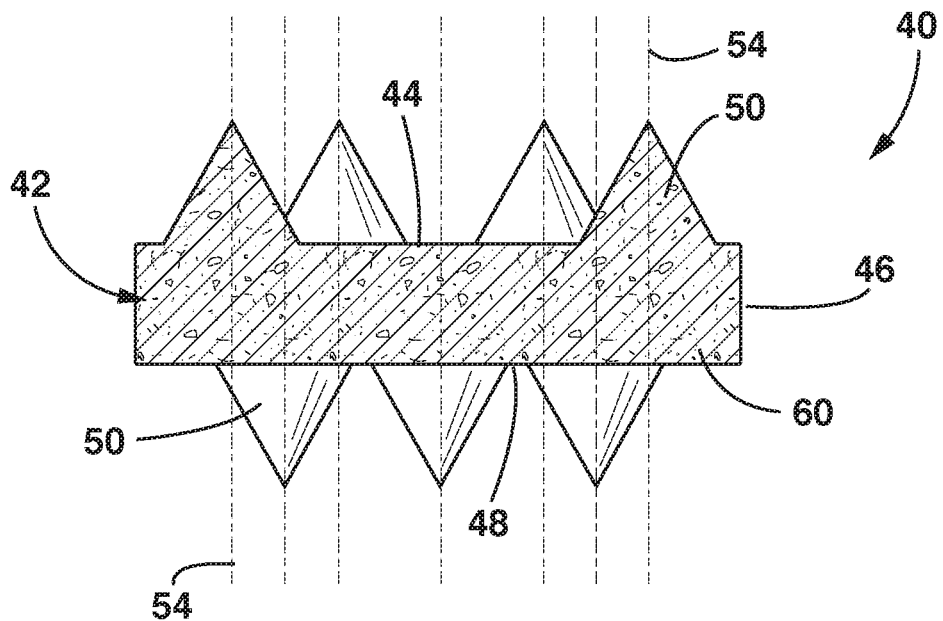
FIG. 14 is a center sectional schematic representation view taken from FIG. 7 and FIG. 8.
Figure 15:
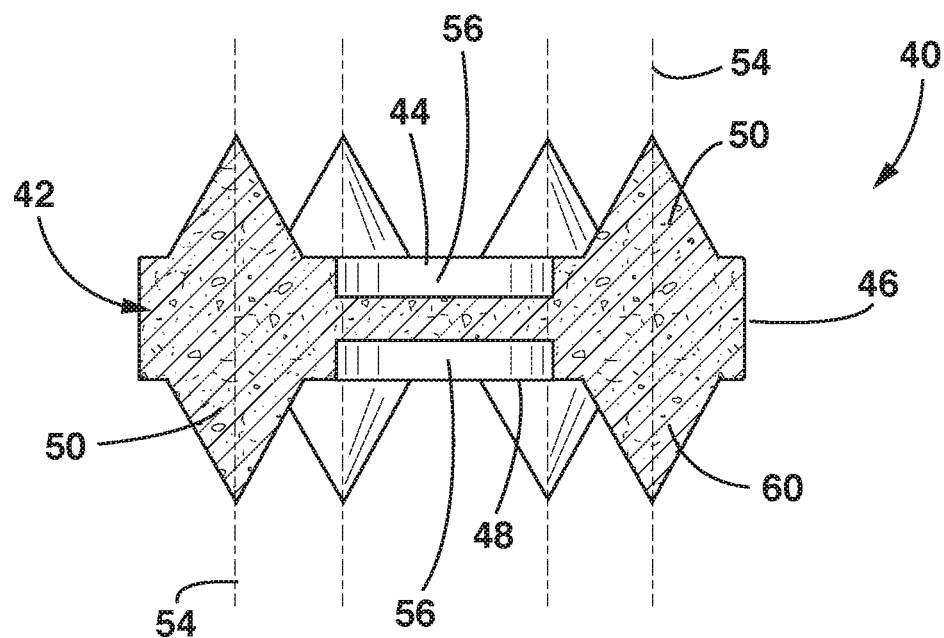
FIG. 15 is a center sectional schematic representation view taken from FIG. 3 and FIG. 4.
Figure 16:
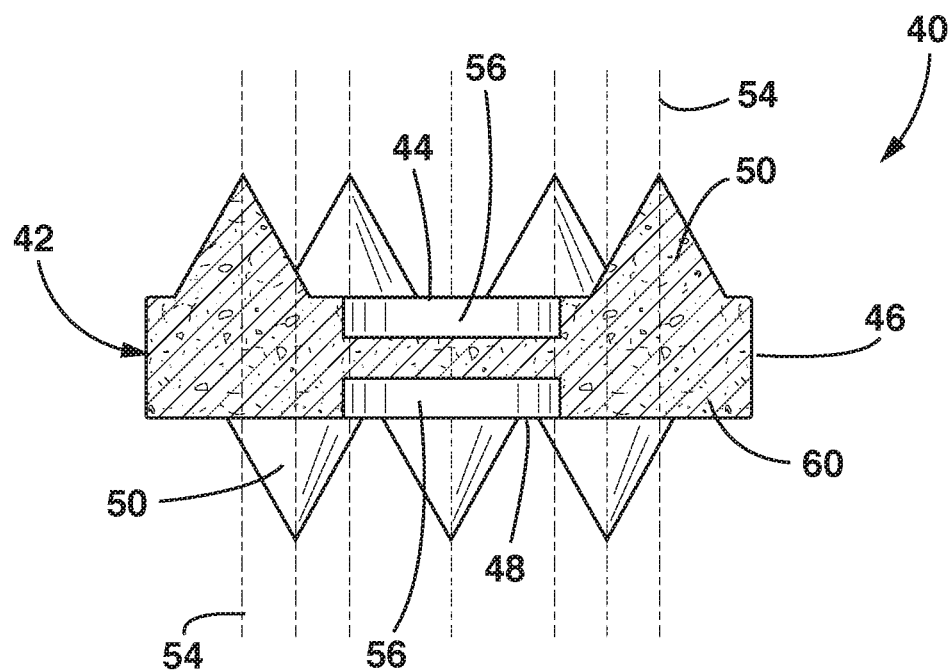
FIG. 16 is a center sectional schematic representation view taken from FIG. 9 and FIG. 10.
Figure 17:
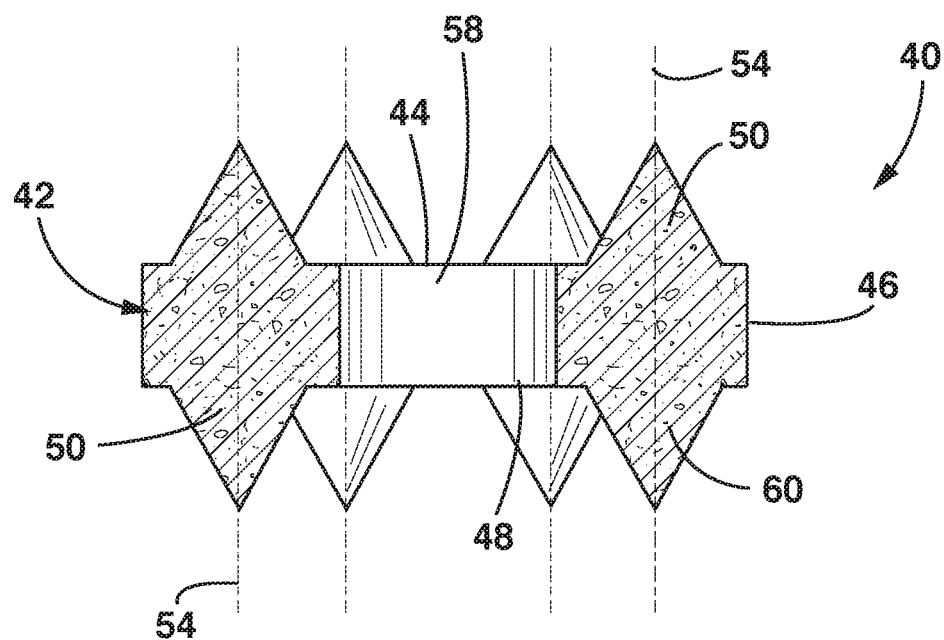
FIG. 17 is a center sectional schematic representation view taken from FIG. 5 and FIG. 6.
Figure 18:
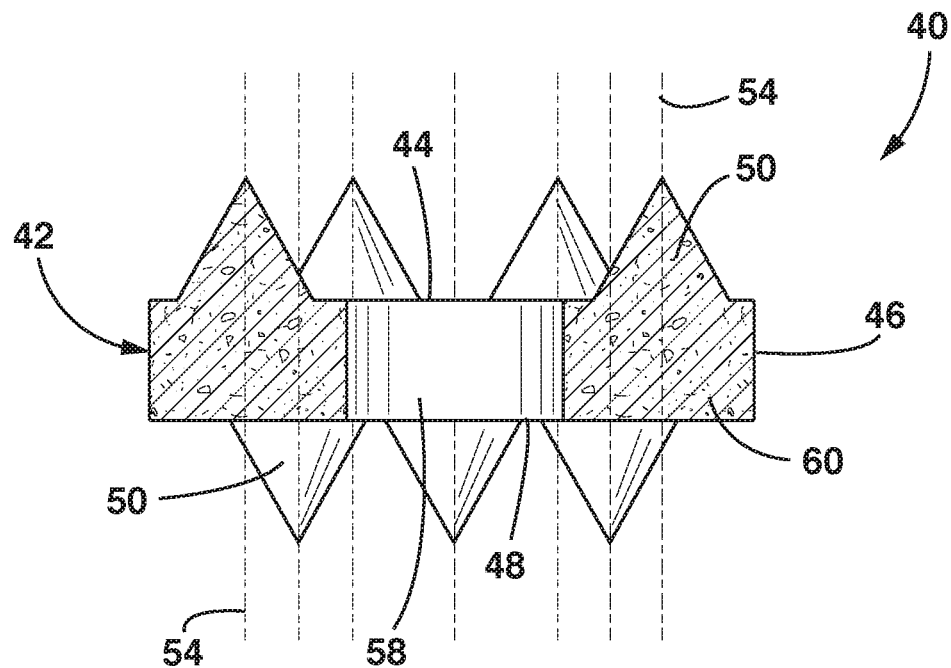
FIG. 18 is a center sectional schematic representation view taken from FIG. 11 and FIG. 12.
Figure 19:
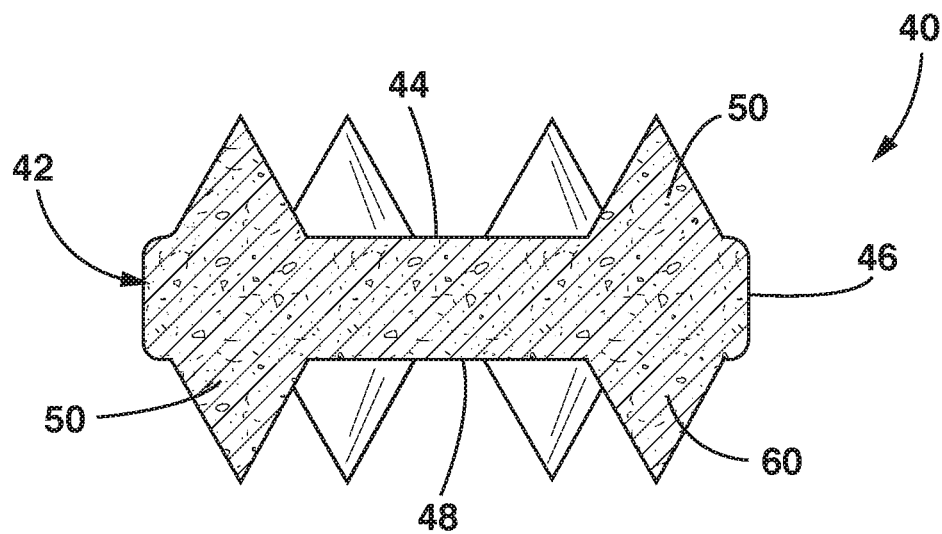
FIG. 19 is a center sectional schematic representation view like FIG. 13 of a seventh embodiment of traction enhancing aggregate.
Figure 20:
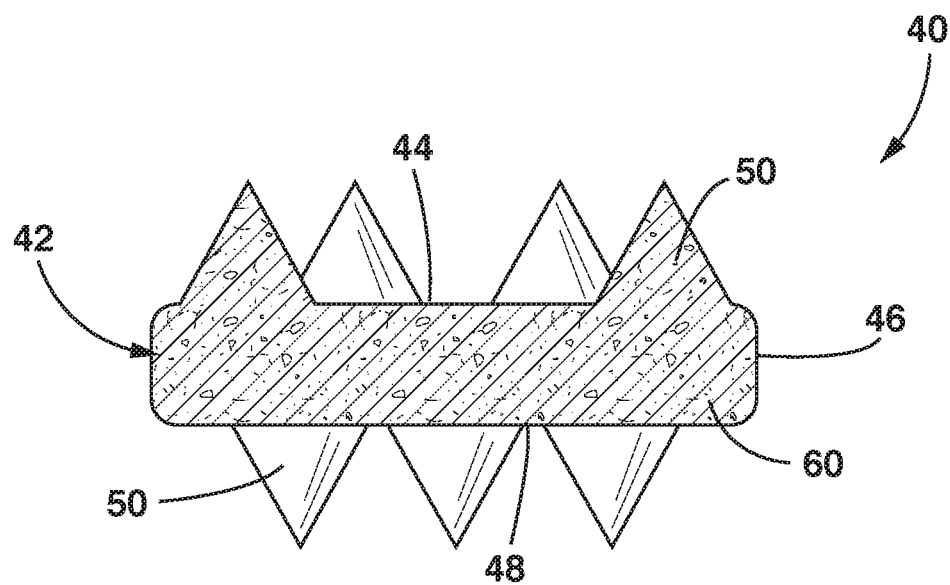
FIG. 20 is a center sectional schematic representation view like FIG. 14 of a eight embodiment of traction enhancing aggregate.
Figure 21:
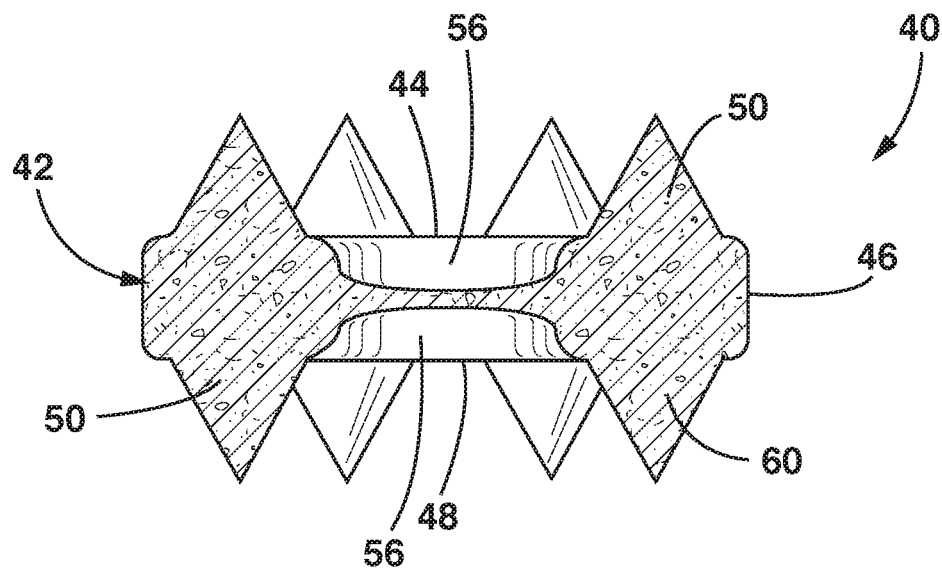
FIG. 21 is a center sectional schematic representation view like FIG. 15 of a ninth embodiment of traction enhancing aggregate.
Figure 22:
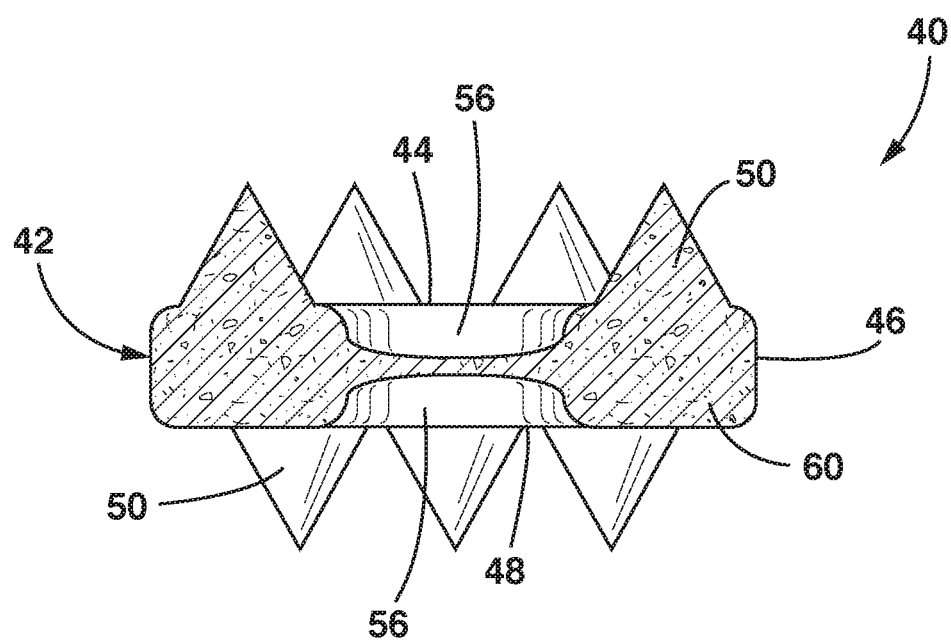
FIG. 22 is a center sectional schematic representation view like FIG. 16 of a tenth embodiment of traction enhancing aggregate.
Figure 23:
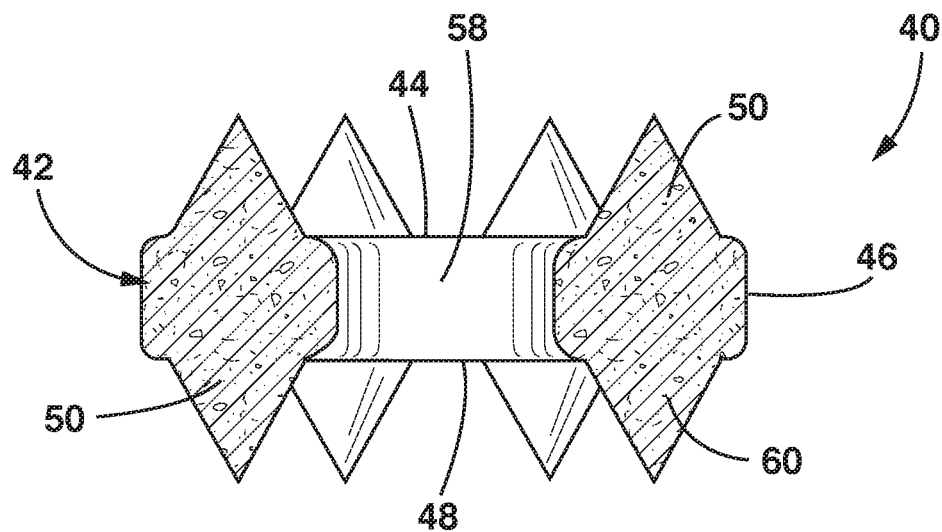
FIG. 23 is a center sectional schematic representation view like FIG. 17 of a eleventh embodiment of traction enhancing aggregate.
Figure 24:
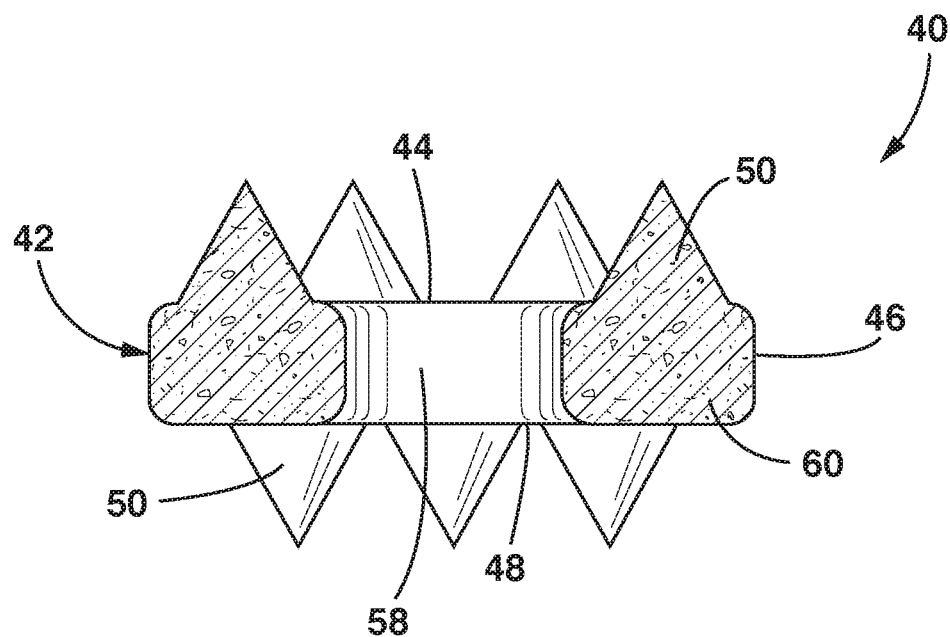
FIG. 24 is a center sectional schematic representation view like FIG. 18 of a twelfth embodiment of traction enhancing aggregate.
Figure 25:
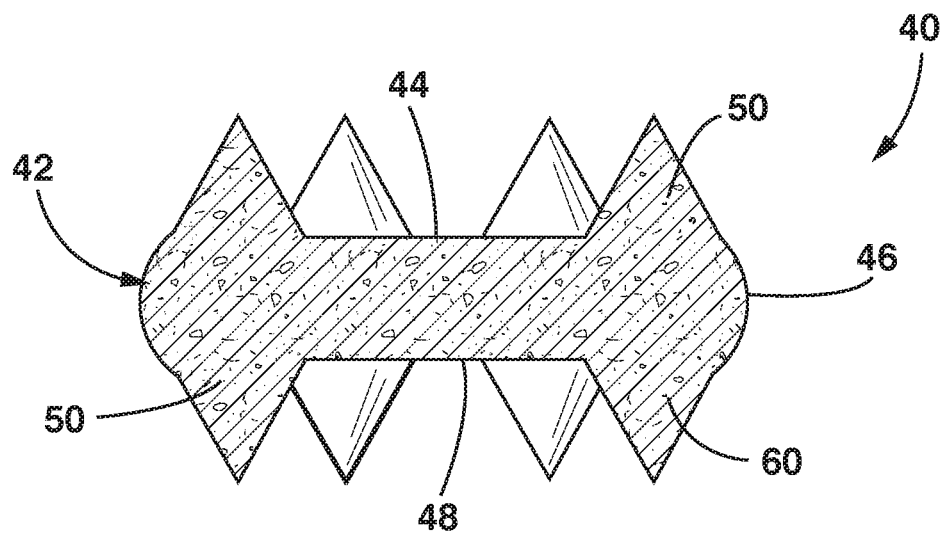
FIG. 25 is a center sectional schematic representation view like FIG. 13 of a thirteenth embodiment of traction enhancing aggregate.
Figure 26:
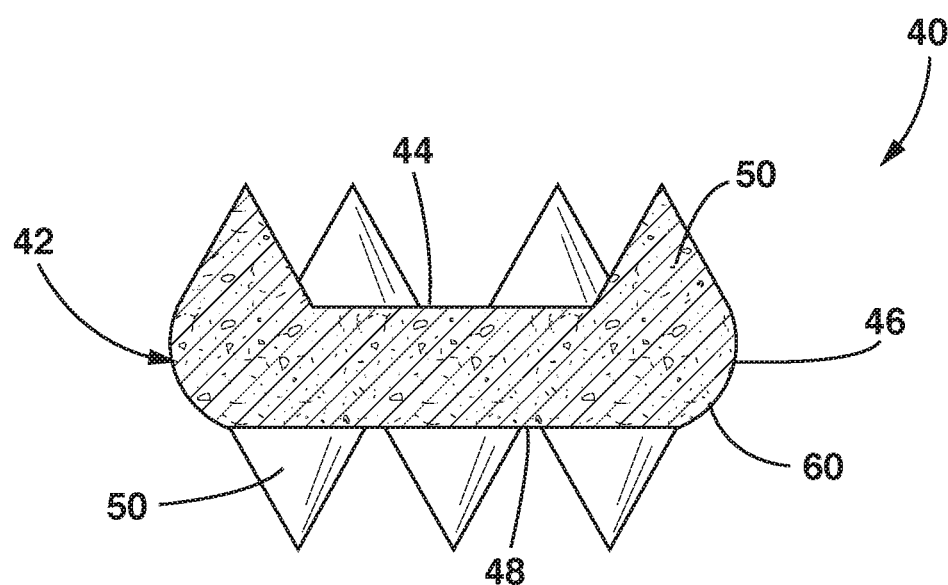
FIG. 26 is a center sectional schematic representation view like FIG. 14 of a fourteenth embodiment of traction enhancing aggregate.
Figure 27:
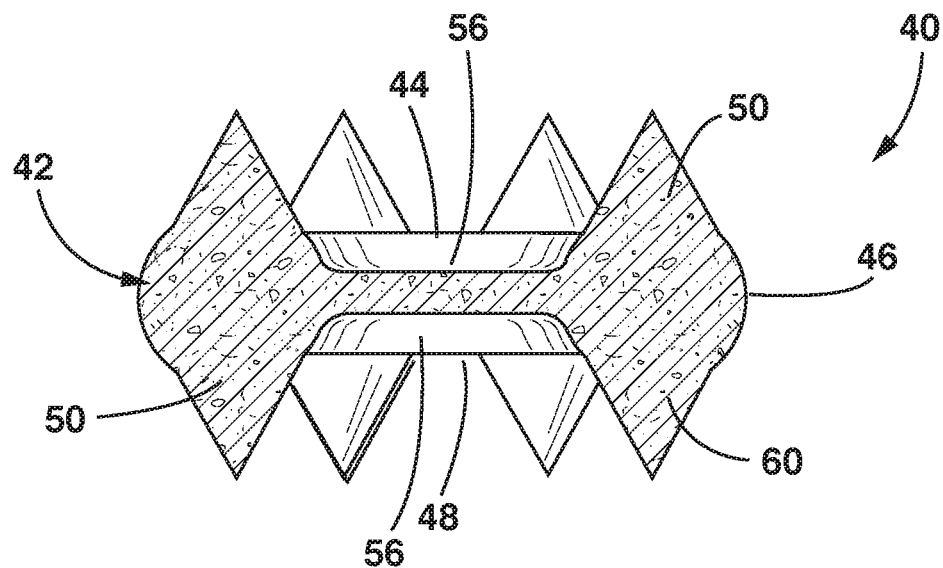
FIG. 27 is a center sectional schematic representation view like FIG. 15 of a fifteenth embodiment of traction enhancing aggregate.
Figure 28:
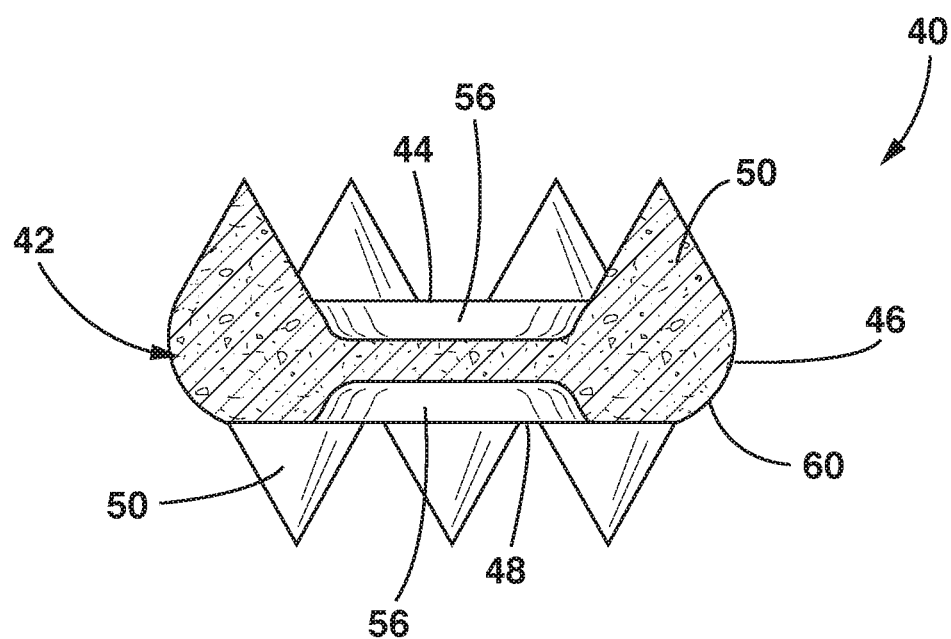
FIG. 28 is a center sectional schematic representation view like FIG. 16 of a sixteenth embodiment of traction enhancing aggregate.
Figure 29:
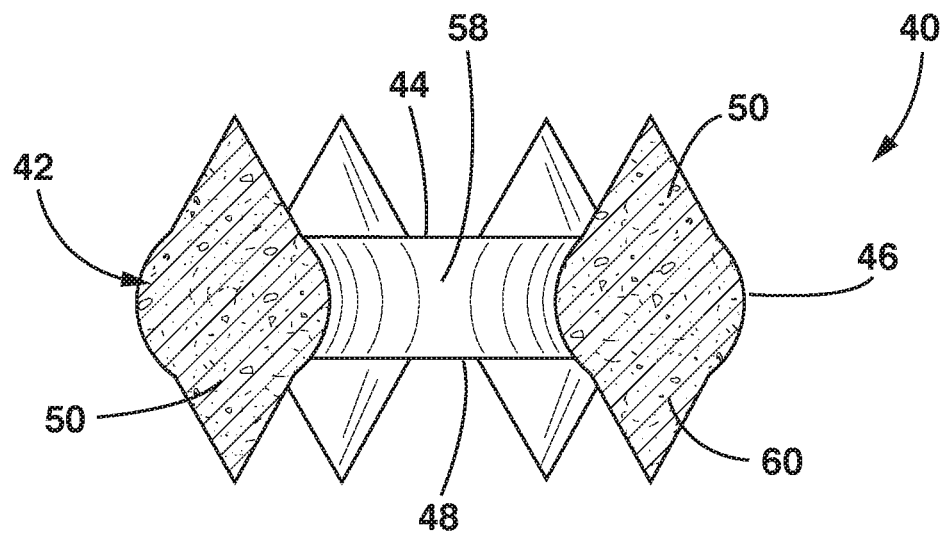
FIG. 29 is a center sectional schematic representation view like FIG. 17 of a seventeenth embodiment of traction enhancing aggregate.
Figure 30:
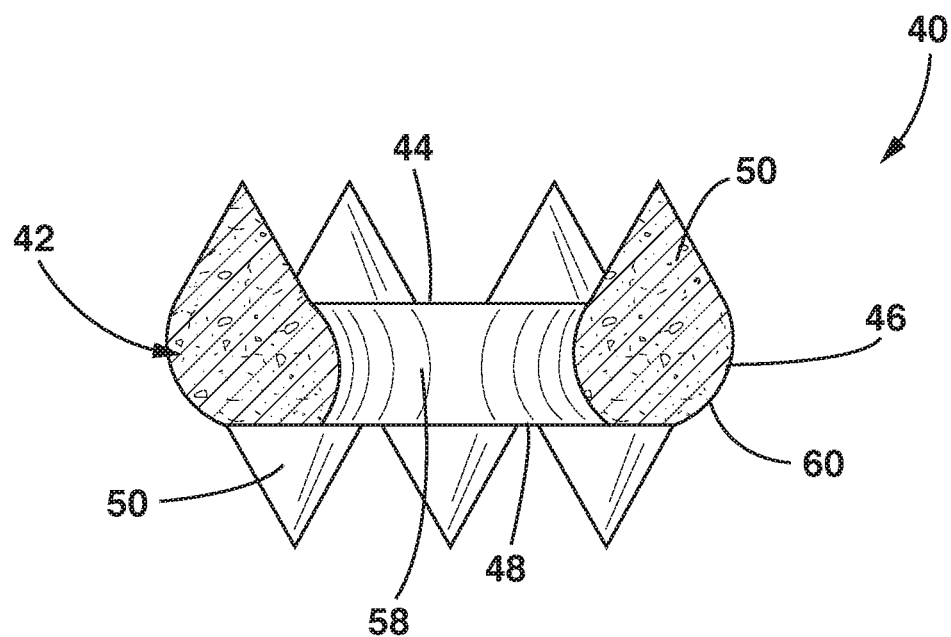
FIG. 30 is a center sectional schematic representation view like FIG. 18 of a eighteenth embodiment of traction enhancing aggregate.

Referring to FIG. 1 through FIG. 32, traction enhancing aggregate 40 is provided, according to at least one embodiment, that includes the body 42 that has the top 44, the side 46 and the bottom 48 surfaces. Protruding from a top surface 44 and a bottom surface 48 are at least three or three or more of the masses 50 each with the axis 54 centralized and equidistantly placed about the centerline 52. The masses 50 are preferably conical as shown and the centerline 52 represents the center of the base circle in a right angle cone, as shown. Other shapes are anticipated and thus within the scope of this disclosure. The top and bottom surfaces 44, 48 may be essentially parallel, e.g., to account for manufacturing tolerances, e.g., +/−about 5%. The side surface 46 may be essentially perpendicular to both or at least one of the top and bottom surfaces 44, 48.

As examples eighteen embodiments are shown in the drawings and more are possible with variations to shape and size. In one embodiment one or more of the depressions 56 occur on a top 44 and/or a bottom surfaces 48 of a body 42. In another embodiment the hole 58 completely penetrates a body 42. The holes may be open or filled with a compound with desirable characteristics, such as salt. In other embodiments FIG. 19 through FIG. 30 are examples of various changes to profiles, along with many others not shown, that are possible within the scope of the invention.

In one embodiment of traction enhancing aggregate 40 conical masses 50 are positioned so axes 54 run perpendicularly through conical masses 50 positioned in mirror image to one another on top 44 and bottom 48. In other words, the same number of conical masses 50 are disposed on each of the top and bottom surfaces 44, 48 and arranged on the surfaces in an orientation that mirrors the other surface.

In another embodiment of traction enhancing aggregate 40 conical masses 50 are positioned so axes 54 do not intersect because conical masses 50 are placed in staggered position on top 44 and bottom 48.

Traction enhancing aggregate 40 measures about 0.5 inches wide by about 0.5 inches long and has a height of about 0.25 inches, accounting for manufacturing tolerances. These dimensions can be made larger or smaller for different applications and may therefore vary by +/−15 percent. As well, axes 54 can vary plus or minus ten degrees from perpendicular to the top 44 or bottom 48 of the body 42. Conical masses 50 can be of equal or varied heights and have their axes 54 spaced at various degrees of spacing about circular centerlines 52 as well as in the two spacing arrangements mentioned above.

Traction enhancing aggregate 40 can have various degrees of radius filleted edges on its inside and outside edges and corners.

A body 42 can be of any geometric shape such as a circle, square, rectangle, polygon or star shape. A circular centerline 52 can be a circle, square, rectangle, polygon, star or any shape to parallelly conform to various possible geometries of a body 42.

Traction enhancing aggregate 40 is formed from the moldable material 60 such as steatite or other ceramic based materials, glass, plastic or any other materials that are moldable in nature.

Figure 31:
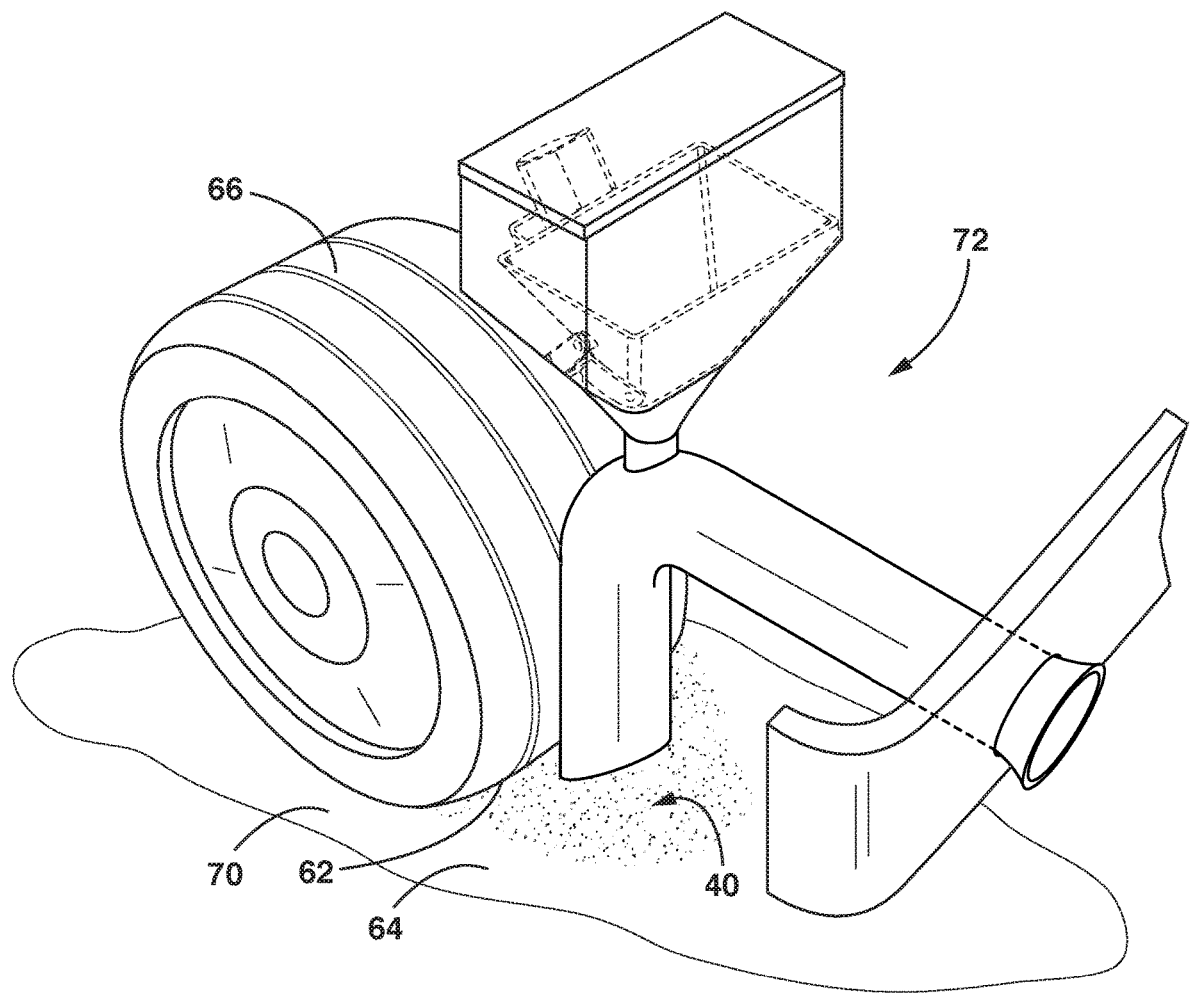
FIG. 31 is a perspective view of traction enhancing aggregate, in use, in a traction enhancing system used on a motor vehicle.

Referring in particular to the drawing FIG. 31. A traction enhancing aggregate 40 is disclosed, in use, in a traction enhancing system 72 used on a motor vehicle. By which air flows through a traction enhancing system 72 and is combined with a traction enhancing aggregate 40 and delivered to a lower surface 64 such as the ground 70 to increase the coefficient of friction and provide a controlled path of traction enhancing aggregate 40 between an upper surface 62 such as a tire 66 and a lower surface 64 such as ground 70.

Figure 32:
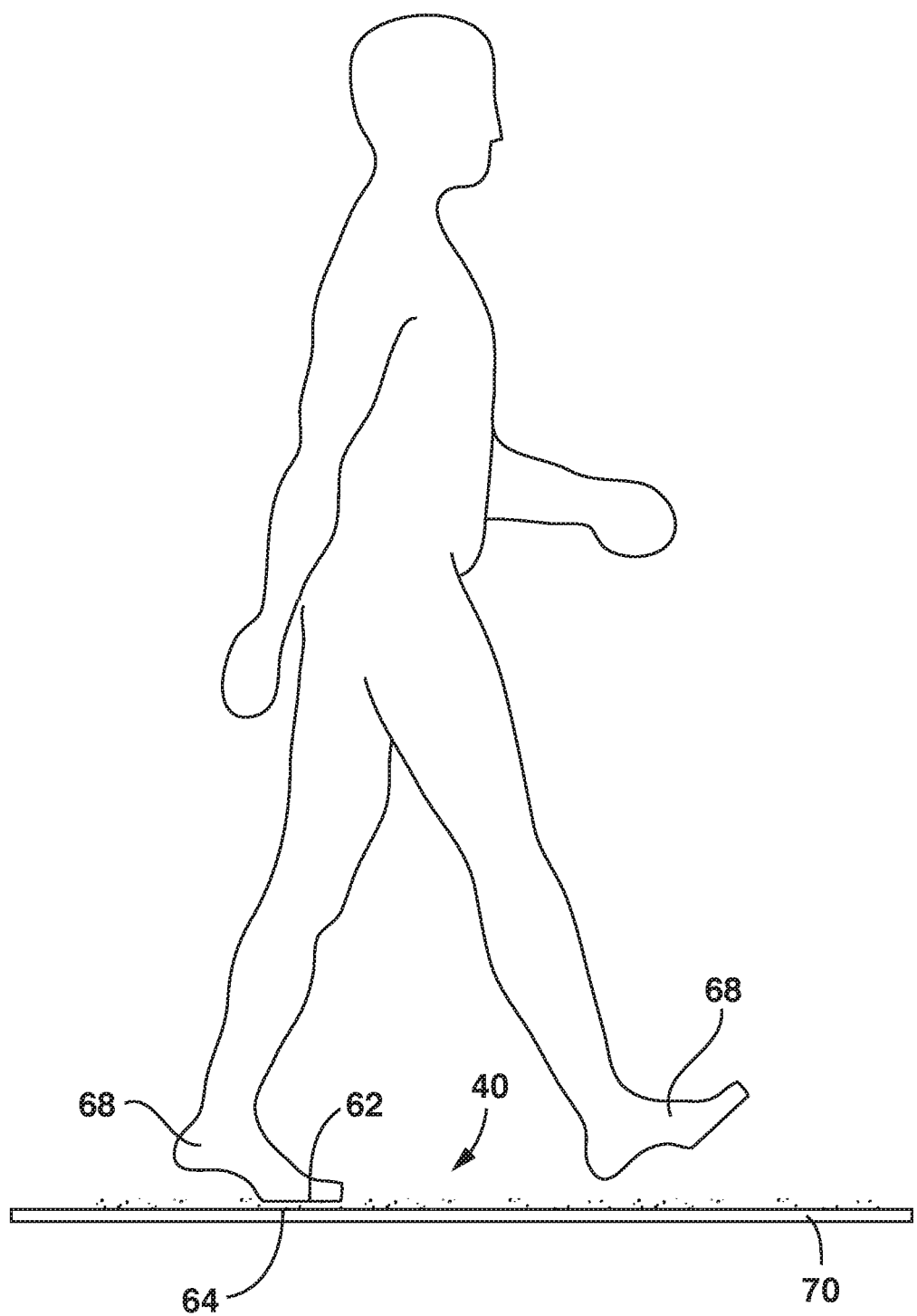
FIG. 32 is a side view of traction enhancing aggregate, in use, below a pedestrian walking.

Referring to the embodiment shown in FIG. 32. A traction enhancing aggregate 40 is disclosed, in use, as a person walking where a traction enhancing aggregate 40 has been hand delivered to a lower surface 64 such as the ground 70 to increase the coefficient of friction and provide a path of traction enhancing aggregate 40 between an upper surface 62 such as a shoe 68 and a lower surface 64 such as ground 70. Lower surfaces 64 can be substances such as ice, snow, water and other substances with a low coefficient of friction.

The above description is given as an example of structure and use for domestic vehicle and pedestrian application. In other macro and micro embodiments the above-mentioned dimensions can vary in proportion to the application. As examples, a macro embodiment of the invention could be larger dimensions to accommodate mining trucks and super sized vehicles or smaller dimensions to accommodate micro embodiments such as drone aircraft or super small robotic controlled vehicles.

Traction enhancing aggregate 40 can be used as an additive to other materials, such as concrete or epoxy coating or in any situation were it is desirable to increase the coefficient of friction of a material.

Traction enhancing aggregate 40 can be clear or any color, such as red or orange to enhance its visibility and warn of a slippery surface 64 or give it ornamental appeal.

Traction enhancing aggregate 40 can be identification marked by various forms of tagging such as ultraviolet and other forms of light sensitive inks and other substances, as well as radio active and other frequency emitting forms of electronic tagging and identity sensing.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A traction enhancing aggregate, comprising a body having a top surface and a bottom surface opposite the top surface, and at least three masses protruding outward from each of the top and bottom surfaces and having a vertex for biting into a surface to be traction enhanced with the aggregate, wherein the masses are conically shaped.

2. The traction enhancing aggregate of claim 1, the body further having a side surface located between the top and bottom surfaces.

3. The traction enhancing aggregate of claim 1, wherein the at least three masses on the top and bottom surfaces each have an axis and wherein the axis of the at least three masses on the top surface, bottom surface, or both surfaces, are centralized and equidistantly placed on the respective top and bottom surfaces.

4. The traction enhancing aggregate of claim 1, wherein the masses are right angle conically shaped.

5. The traction enhancing aggregate of claim 1, wherein the top and bottom surfaces are essentially parallel to each other.

6. The traction enhancing aggregate of claim 1, the body further having a side surface located between the top and bottom surfaces, and wherein the side surface is essentially perpendicular to one or both of the top and bottom surfaces.

7. The traction enhancing aggregate of claim 1, the body further has one or more depression in one or both of the top and bottom surfaces.

8. The traction enhancing aggregate of claim 7, wherein at least one of the one or more depressions is centrally located on one or both of the top and bottom surfaces.

9. The traction enhancing aggregate of claim 1, the body further has one or more apertures extending through the top and bottom surfaces.

10. The traction enhancing aggregate of claim 9, wherein at least one of the one or more apertures is centrally located on the top and bottom surfaces.

11. The traction enhancing aggregate of claim 1, wherein the at least three masses on the top surface are located thereon in locations that mirror locations of the at least three masses on the bottom surface.

12. The traction enhancing aggregate of claim 1, wherein the at least three masses on the top, bottom, or both top and bottom surfaces have axes that are perpendicular to the respective top and bottom surfaces.

13. The traction enhancing aggregate of claim 1, wherein the top and bottom surfaces each have a same number of masses thereon.

14. The traction enhancing aggregate of claim 13, wherein the masses on the top surface are arranged an orientation that mirrors the orientation of the masses on the bottom surface.

15. The traction enhancing aggregate of claim 13, wherein the masses on the top surface are arranged a staggered orientation relative to the masses on the bottom surface.

16. The traction enhancing aggregate of claim 1, wherein a height of the aggregate measured between apex of the masses on the top and bottom surfaces is plus or minus 15 percent of 0.25 inches.

17. The traction enhancing aggregate of claim 1, wherein a width of the aggregate measures plus or minus 15 percent of 0.5 inches.

18. A traction enhancing aggregate, comprising a body having a top surface and a bottom surface opposite and essentially parallel to the top surface, and at least three conical masses protruding outward from each of the top and bottom surfaces and having a vertex for biting into a surface to be traction enhanced with the aggregate, wherein the at least three masses on the top and bottom surfaces each have an axis and wherein the axis of the at least three masses on the top surface, bottom surface, or both surfaces, are centralized and equidistantly placed on the respective top and bottom surfaces, and wherein a height of the aggregate measured between apex of the masses on the top and bottom surfaces is plus or minus 15 percent of 0.25 inches, and wherein a width of the aggregate measures plus or minus 15 percent of 0.5 inches.

19. A traction enhancing aggregate, comprising a body having a top surface and a bottom surface opposite the top surface, and at least three masses protruding outward from each of the top and bottom surfaces and having a vertex for biting into a surface to be traction enhanced with the aggregate, wherein the body further has one or more depression in one or both of the top and bottom surfaces.

20. The traction enhancing aggregate of claim 19, wherein the masses are right angle conically shaped.

21. A traction enhancing aggregate, comprising a body having a top surface and a bottom surface opposite the top surface, and at least three masses protruding outward from each of the top and bottom surfaces and having a vertex for biting into a surface to be traction enhanced with the aggregate, wherein each of the masses have a regular shaped cross section at an intersection of the respective top or bottom surface and the masses.

* * * * *